(12) United States Patent
Waki et al.

(10) Patent No.: US 9,964,393 B2
(45) Date of Patent: May 8, 2018

(54) MEASUREMENT DEVICE FOR RING-SHAPED ASSEMBLY, MEASUREMENT METHOD FOR RING-SHAPED ASSEMBLY, AND MANUFACTURING METHOD OF ROTATING MACHINE

(71) Applicant: MITSUBISHI HITACHI POWER SYSTEMS, LTD., Kanagawa (JP)

(72) Inventors: Kunihiko Waki, Tokyo (JP); Kenichi Arase, Tokyo (JP); Yugo Tokunaga, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 189 days.

(21) Appl. No.: 14/902,200

(22) PCT Filed: Jul. 14, 2014

(86) PCT No.: PCT/JP2014/068685
§ 371 (c)(1),
(2) Date: Dec. 30, 2015

(87) PCT Pub. No.: WO2015/008725
PCT Pub. Date: Jan. 22, 2015

(65) Prior Publication Data
US 2016/0370163 A1    Dec. 22, 2016

(30) Foreign Application Priority Data
Jul. 16, 2013    (JP) .................................. 2013-147520

(51) Int. Cl.
*G01B 5/14*    (2006.01)
*G01B 5/20*    (2006.01)
(Continued)

(52) U.S. Cl.
CPC .............. *G01B 5/14* (2013.01); *F01D 11/001* (2013.01); *F01D 25/285* (2013.01); *G01B 5/20* (2013.01); *G01M 15/14* (2013.01)

(58) Field of Classification Search
CPC ..................................... G01B 5/14; G01B 5/20
(Continued)

(56) References Cited

U.S. PATENT DOCUMENTS 2,657,468 A * 11/1953 Lyons .................... G01B 5/252
116/DIG. 34
3,046,665 A * 7/1962 Nilsson .................... G01B 3/00
33/549

(Continued)

FOREIGN PATENT DOCUMENTS

CN    202188806    4/2012
JP    63-14105    1/1988
(Continued)

OTHER PUBLICATIONS

International Search Report dated Sep. 30, 2014 in International Application No. PCT/JP2014/068685.
(Continued)

*Primary Examiner* — Christopher Fulton
(74) *Attorney, Agent, or Firm* — Wenderoth, Lind & Ponack, L.L.P.

(57) ABSTRACT

A measurement device for a ring-shaped assembly that measures relative positions, is provided with: a first contact section that comes into contact with a reference surface that is continuous in the circumferential direction of the ring-shaped member and is capable of sliding in the circumferential direction; a second contact section capable of pressing against an opposing surface that faces an opposite side in the radial direction from the reference surface of the ring-shaped member; a base section that supports the first contact section
(Continued)

and the second contact section; a third contact section that comes into contact with a measurement-target part of the assembled member; a connecting section that connects the third contact section and the base section; and a measurement unit that measures a displacement of the third contact section relative to the base section.

8 Claims, 5 Drawing Sheets

(51) Int. Cl.
  *F01D 11/00* (2006.01)
  *F01D 25/28* (2006.01)
  *G01M 15/14* (2006.01)

(58) Field of Classification Search
  USPC ......... 33/542, 543, 549, 550, 551, 553, 555, 33/555.1
  See application file for complete search history.

(56) References Cited

U.S. PATENT DOCUMENTS

| | | | | |
|---|---|---|---|---|
| 3,305,932 | A | * | 2/1967 | Iselin ................. B07C 5/02 33/501.02 |
| 4,064,633 | A | * | 12/1977 | Wertepny ............ G01B 5/08 33/550 |
| 4,251,922 | A | * | 2/1981 | Perlotto ........... B23Q 17/2225 33/1 M |
| 4,333,237 | A | * | 6/1982 | Carbone ........... A63B 67/068 33/289 |
| 4,578,869 | A | * | 4/1986 | O'Brien ............. G01B 5/25 33/533 |
| 5,031,335 | A | * | 7/1991 | Kimmelman ......... A01D 34/54 33/613 |
| 5,101,573 | A | | 4/1992 | Mills et al. |
| 5,419,056 | A | * | 5/1995 | Breitenstein ........ G01B 5/252 33/549 |
| 5,810,341 | A | | 9/1998 | Williams |
| 6,286,223 | B1 | * | 9/2001 | Iwamoto ............ G01B 5/08 33/555.1 |
| 7,748,134 | B1 | * | 7/2010 | Wang .................. G01B 5/201 33/551 |
| 8,167,287 | B2 | * | 5/2012 | Horiuchi ............ F01D 25/285 269/3 |
| 8,776,388 | B2 | * | 7/2014 | Higgins ............ G01B 5/0004 33/551 |
| 2002/0066774 | A1 | | 6/2002 | Prochac |
| 2002/0144752 | A1 | | 10/2002 | Jones |
| 2005/0184439 | A1 | | 8/2005 | Janson et al. |
| 2007/0119067 | A1 | | 5/2007 | MacKey |
| 2007/0216078 | A1 | | 9/2007 | Jaffers et al. |
| 2009/0051096 | A1 | | 2/2009 | Horiuchi et al. |

FOREIGN PATENT DOCUMENTS

| | | |
|---|---|---|
| JP | 04-063022 | 5/1992 |
| JP | 2008-151007 | 7/2008 |
| JP | 2009-012281 | 1/2009 |
| JP | 4690903 | 6/2011 |
| TW | 201323826 | 6/2013 |

OTHER PUBLICATIONS

Written Opinion of the International Searching Authority dated Sep. 30, 2014 in International Application No. PCT/JP2014/068685.
Taiwan Office Action dated Sep. 2, 2015 in corresponding Taiwanese patent application No. 103124277.
Notice of Reasons for Rejection dated Nov. 1, 2016 in corresponding Japanese patent application No. 2013-147520 (with English translation).

* cited by examiner

US 9,964,393 B2

MEASUREMENT DEVICE FOR RING-SHAPED ASSEMBLY, MEASUREMENT METHOD FOR RING-SHAPED ASSEMBLY, AND MANUFACTURING METHOD OF ROTATING MACHINE

TECHNICAL FIELD

The present invention relates to a measurement device for a ring-shaped assembly having, for example, a blade ring and a support ring of a turbine, a measurement method for a ring-shaped assembly, and a manufacturing method of a rotating machine.

This application claims priority based on Japanese Patent Application No. 2013-147520 filed in Japan on Jul. 16, 2013, of which the contents are incorporated herein by reference.

BACKGROUND ART

During assembly work in a manufacturing process of a turbine or in maintenance of a turbine (replacement work of a vane constituting a part of a blade ring, for example), assembly accuracy of a ring-shaped assembly is important. This ring-shaped assembly is constituted of a blade ring that retains the vane, and a retaining ring that is fixed to an inner circumferential side of the vane and retains a seal ring.

During this work, the blade ring and the retaining ring are positioned (adjusted for coaxiality) using a measurement device for a ring-shaped assembly. At this time, when the positioning of the blade ring and the retaining ring is inappropriate, a gap between the seal ring and a seal fin becomes inappropriate, and sufficient sealability is not achieved. Further, rubbing (contact between a rotating section and a stationary section of a turbine) may occur during rotor rotation due to an eccentricity of the seal ring.

Examples of conventional measurement devices for a ring-shaped assembly include the device described in Patent Document 1, for example. As illustrated in FIG. 6, a measurement device 101 is a device that, in a ring-shaped assembly 60 that includes a blade ring 61, a retaining ring 62, and a vane 63, ensures the assembly accuracy of the retaining ring 62 with respect to the blade ring 61 by measuring a relative position in a radial direction of the retaining ring 62 with respect to the blade ring 61.

In the positioning work using the measurement device 101, a distance between a reference point on the blade ring 61 side and a measurement point on the retaining ring 62 side is measured at a plurality of points on the blade ring 61. In the positioning work using the measurement device 101, an attachment position of the retaining ring 62 with respect to the blade ring 61 is finely adjusted on the basis of this measured value.

The measurement device 101 includes a base section 106, a shaft section 107, and a probe section 108. During measurement, the base section 106 is disposed on an outer circumferential side edge part 61a of the blade ring 61, and defines the reference point on the blade ring 61 side. The shaft section 107 is fixed to and arranged on the base section 106, and extends to an inner side in the radial direction of the blade ring 61 during measurement. The probe section 108 includes a dial gauge 28 attached to a tip of the shaft section 107, and defines the measurement point on the retaining ring 62 side.

CITATION LIST

Patent Literature

Patent Document 1: Japanese Patent No. 4690903B

SUMMARY OF INVENTION

Technical Problem

However, in the conventional measurement device 101, a guide roller 124 disposed below a side part of the base section 106 is made to contact with an outer circumferential surface 61b of the blade ring 61 while a plurality of base legs 103 of the base section 106 are made to contact with the outer circumferential side edge part 61a of the blade ring 61 to define the reference point of the base section 106. That is, the outer circumferential surface 61b of the blade ring 61 is a reference surface in the radial direction of the blade ring of the measurement device 101.

Nevertheless, when the reference point is defined using such a method, it is difficult to make the guide roller 124 contact with the outer circumferential surface 61b, which is the reference surface, with a predetermined pressing force. Accordingly, the problem arises that a position of the base section 106 with respect to the reference surface is not stabilized, and thus the measurement accuracy is not high.

An object of the present invention is to provide a measurement device for a ring-shaped assembly capable of increasing accuracy when measuring, in a ring-shaped assembly having a plurality of assembled members arranged side by side in a circumferential direction that are assembled onto a ring-shaped member, relative positions in a radial direction of the assembled members with respect to the ring-shaped member.

Solution to Problem

According to a first aspect of the present invention, there is provided a measurement device for a ring-shaped assembly that, in a ring-shaped assembly having a plurality of assembled members arranged side by side in a circumferential direction that are assembled onto a ring-shaped member, measures relative positions in a radial direction of the assembled members with respect to the ring-shaped member, the measurement device including: a first contact section that comes into contact with a reference surface that is continuous in the circumferential direction of the ring-shaped member and is capable of moving in the circumferential direction along the reference surface; a second contact section capable of pressing against an opposing surface that faces an opposite side in the radial direction from the reference surface of the ring-shaped member; a base section that supports the first contact section and the second contact section; a third contact section that comes into contact with a measurement-target part of the assembled member; a connecting section that connects the third contact section and the base section; and a measurement unit that measures a displacement of the third contact section relative to the base section.

According to the above-described configuration, the second contact section presses against the opposing surface, thereby causing the first contact section to come into contact with the reference surface with a predetermined pressing force. As a result, the position of the base section with respect to the reference surface is stabilized, making it possible to increase the accuracy when measuring the displacement of the third contact section relative to the base section. That is, it is possible to increase the accuracy when measuring the relative positions in the radial direction of the assembled members with respect to the ring-shaped member in the ring-shaped assembly.

In the above-described measurement device for a ring-shaped assembly, the second contact section preferably forms a spherical shape capable of rolling on the opposing surface in the circumferential direction.

According to the above-described configuration, the measurement device can be moved in the circumferential direction with the position of the base section with respect to the reference surface retained, making it possible to measure a change in the displacement of the third contact section relative to the base section with high accuracy.

In the above-described measurement device for a ring-shaped assembly, the reference surface and the opposing surface are preferably surfaces provided on both mutually opposing sides in the radial direction that constitute a groove formed on an inner side in the radial direction of the ring-shaped member, and the base section preferably includes a block-like fitted member that includes the first contact section and is inserted into the groove, and a guide roller that includes the second contact section.

According to the above-described configuration, it is possible to fix the base section of the measurement device to the ring-shaped member even when there is a protrusion on an upper part in a vertical direction of the ring-shaped member. Further, it is possible to easily fix the base section and the ring-shaped member by sliding the fitted member along the groove.

In the above-described measurement device for a ring-shaped assembly, the ring-shaped member is preferably a blade ring of a turbine, and the groove is preferably a groove used to fix a heat shield ring of the turbine.

According to the above-described configuration, it is possible to fix the base section to the ring-shaped member without newly machining a groove for fixing the base section.

In the above-described measurement device for a ring-shaped assembly, the base section may be disposed on a first side in a center axis direction of the ring-shaped member and include a support member that supports the connecting section by extending from the connecting section to a second side opposite the first side in the center axis direction and causing a tip thereof to come into contact with a surface facing the first side in the center axis direction of the assembled member.

According to the above-described configuration, the connecting section extends to the inner side in the radial direction of the base section, making it possible to stabilize a position of the third contact section even when the rigidity is inadequate.

Further, the present invention provides a measurement method for a ring-shaped assembly that, in a ring-shaped assembly having a plurality of assembled members arranged side by side in a circumferential direction that are assembled onto a ring-shaped member, measures relative positions in a radial direction of the assembled members with respect to the ring-shaped member. The method includes: a base section disposing step of causing a first contact section of a base section of a measurement device to come into contact with a reference surface that is continuous in the circumferential direction of the ring-shaped member and causing a second contact section of the base section of the measurement device to press against an opposing surface that faces an opposite side in the radial direction from the reference surface of the ring-shaped member; a measurement-target part contacting step of causing a third contact section connected to the base section to come into contact with a measurement-target part of the assembled member; and a displacement measuring step of measuring a displacement in the radial direction of the third contact section relative to the base section while moving the base section in the circumferential direction along the reference surface with the first contact section in contact with the reference surface.

According to the above-described configuration, the second contact section presses against the opposing surface, thereby causing the first contact section to come into contact with the reference surface with a predetermined pressing force. As a result, the position of the base section with respect to the reference surface is stabilized, making it possible to increase the accuracy when measuring the displacement of the third contact section relative to the base section. That is, it is possible to increase the accuracy when measuring the relative positions in the radial direction of the ring-shaped member and the assembled members that constitute the ring-shaped assembly.

In the above-described measurement method for a ring-shaped assembly, it is preferable that, in the base section disposing step, with surfaces on both mutually opposing sides in the radial direction of a groove formed in the ring-shaped member serving as the reference surface and the opposing surface, the fitted member of the base section including the first contact section is fitted into the groove, and in the displacement measuring step, the fitted member is moved in an interior of the groove.

According to the above-described configuration, it is possible to fix the base section of the measurement device to the ring-shaped member even when there is a protrusion on an upper part in the vertical direction of the ring-shaped member. Further, it is possible to easily fix the base section and the ring-shaped member by sliding the fitted member along the groove.

Further, the present invention provides a manufacturing method of a rotating machine. The method includes: a ring-shaped assembly assembling step of assembling the plurality of assembled members onto the ring-shaped member so that the assembled members are arranged side by side in a circumferential direction; a measuring step of measuring relative positions in a radial direction of the assembled members with respect to the ring-shaped member by the above-described measurement method for a ring-shaped assembly; and a ring-shaped assembly attaching step of assembling the ring-shaped assembly onto a casing, with assembly accuracy of the assembled members with respect to the ring-shaped member ensured on the basis of measurement results from the measuring step.

Advantageous Effects of Invention

According to the present invention, in a ring-shaped assembly in which a plurality of assembled members arranged side by side in a circumferential direction are assembled onto a ring-shaped member, it is possible to increase accuracy when measuring relative positions in a radial direction of the assembled members with respect to the ring-shaped member.

DESCRIPTION OF EMBODIMENT

The following describes in detail an embodiment of the present invention, with reference to the drawings.

A measurement device for a ring-shaped assembly of the present embodiment is a jig used for positioning (adjusting the coaxiality of) a blade ring and a retaining ring of a seal ring of a turbine, for example, during reassembly of the turbine due to maintenance or the like.

The blade ring and the retaining ring are positioned with respect to a ring-shaped assembly in which the retaining ring, which is an assembled member, is assembled onto the blade ring, which is a ring-shaped member. The blade ring and the retaining ring are positioned by measuring a relative position in a radial direction of the retaining ring with respect to the blade ring, and ensuring assembly accuracy (coaxiality) on the basis of the measurement result.

First, a description will be given of a gas turbine which is a rotating machine provided with a blade ring.

Figure 1:
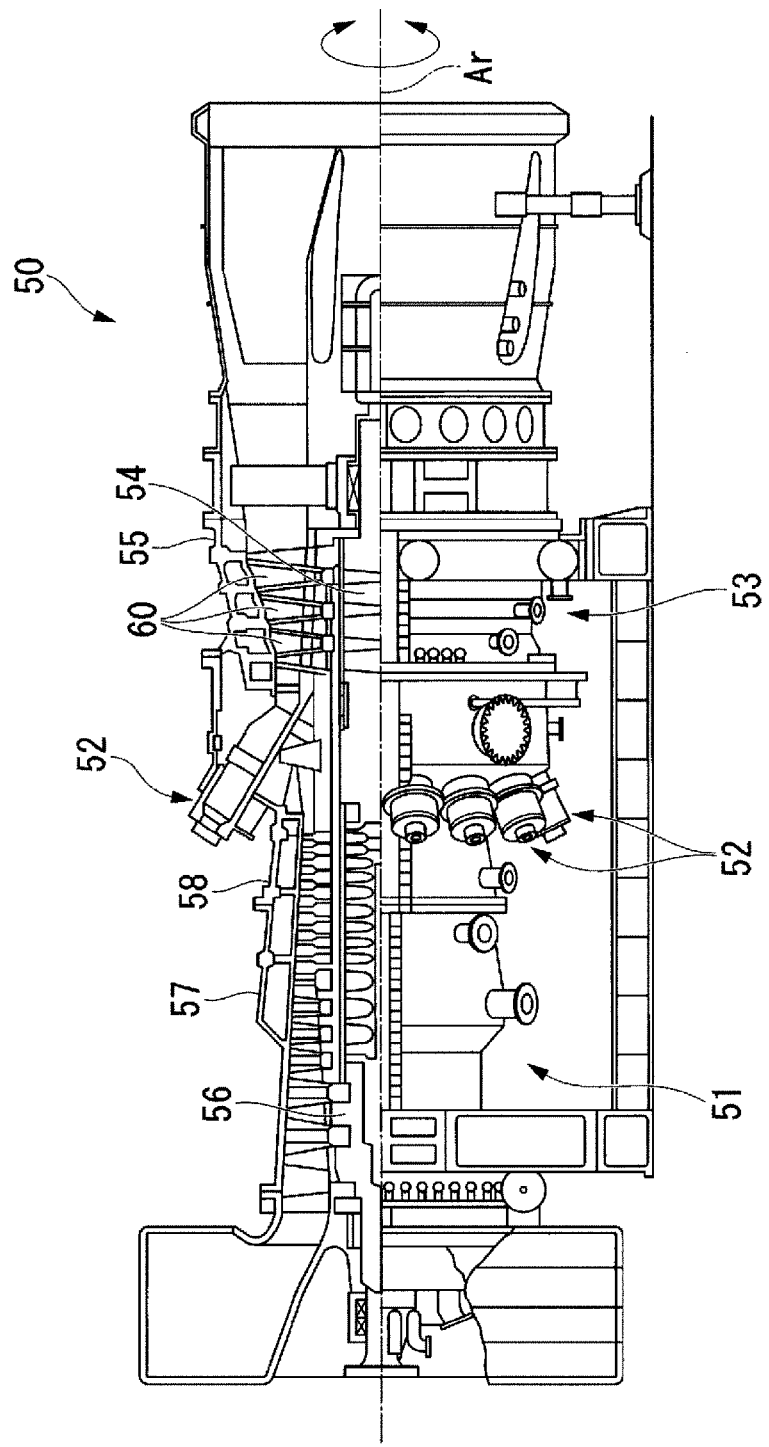
FIG. 1 is a cutaway side view of essential parts of a gas turbine including a ring-shaped assembly which is a measurement target of a measurement device for a ring-shaped assembly of an embodiment of the present invention.

As illustrated in FIG. 1, a gas turbine 50 includes a compressor 51 that compresses outside air to generate compressed air, a combustor 52 that mixes a fuel from a fuel supply source with the compressed air and combusts the mixture to generate a combustion gas, and a turbine 53 that is driven by the combustion gas.

The turbine 53 is a rotating machine. The turbine 53 has a turbine rotor 54 rotating about an axis Ar, and a turbine casing 55 (a casing) which covers this turbine rotor 54 while allowing the turbine rotor 54 to rotate. The compressor 51 is a rotating machine. The compressor 51 has a compressor rotor 56 which rotates about the axis Ar, and a compressor casing 57 which covers the compressor rotor 56 while allowing the compressor rotor 56 to rotate.

The gas turbine 50 further has a compressor and turbine casing 58 which covers the turbine 53 side of the compressor rotor 56 and the compressor 51 side of the turbine rotor 54. The compressor casing 57, the turbine casing 55, and the compressor and turbine casing 58 are all formed in a cylindrical shape about the axis Ar. The turbine rotor 54 and the compressor rotor 56 are linked to each other and rotate integrally about the axis Ar.

On the inner circumferential side of the turbine casing 55, a plurality of ring-shaped assemblies 60 which form a ring shape about the axis Ar are provided side by side in an axial direction. The ring-shaped assembly 60 has a blade ring 61 (refer to FIG. 2) and a retaining ring 62 (refer to FIG. 2) which are measurement targets of a measurement device 1 of the present embodiment. Each of the ring-shaped assemblies 60 is dividable in a circumferential direction for convenience of assembly.

Next, the ring-shaped assembly 60 having the blade ring 61 and the retaining ring 62 which are the measurement targets will be described.

Figure 2:
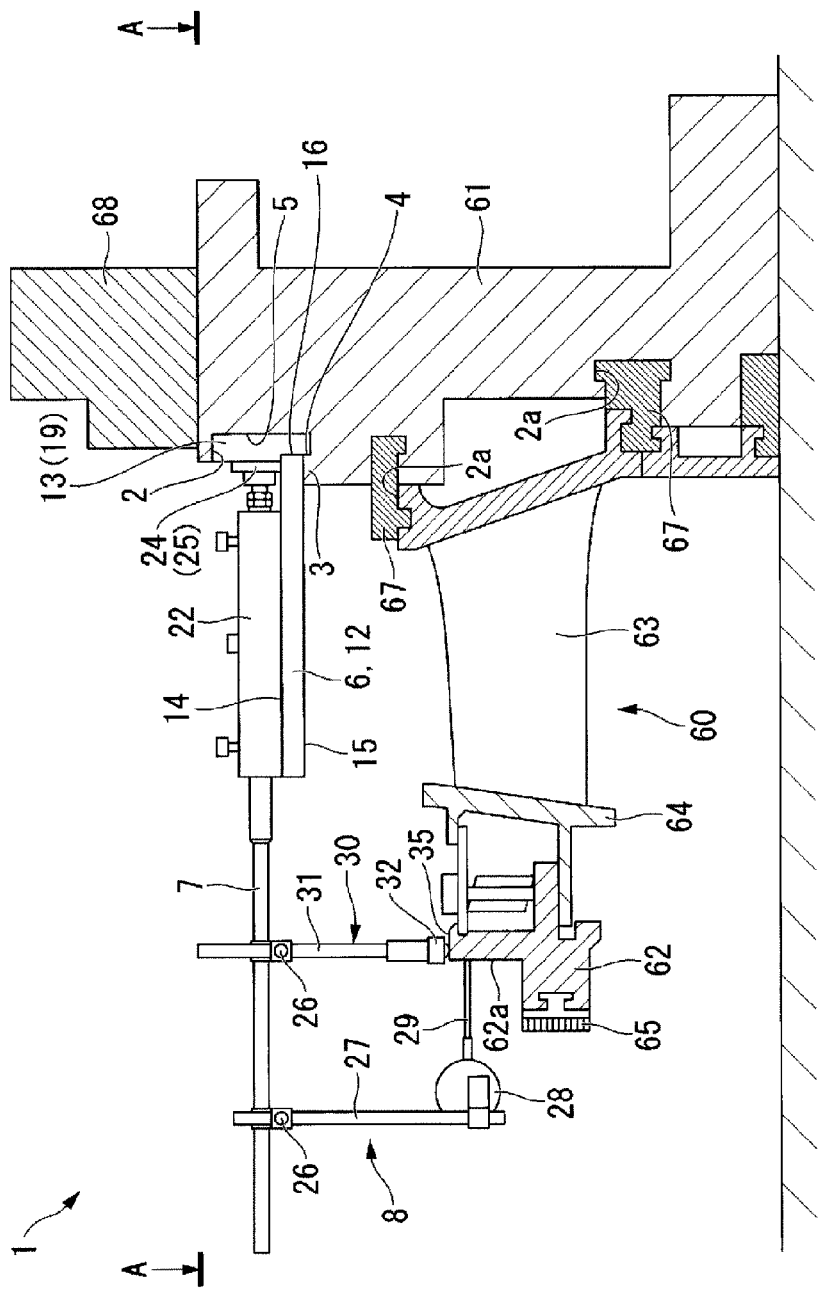
FIG. 2 is a side view of the measurement device for a ring-shaped assembly of the embodiment of the present invention.

As illustrated in FIG. 2, the ring-shaped assembly 60 includes the blade ring 61, which is a ring-shaped member constituted of a plurality of elements, a plurality of vanes 63 attached in the circumferential direction on the inner circumferential side of the blade ring 61, an inner shroud 64 provided on the inner circumferential side of the vane 63, the retaining ring 62 fixed to a flange of the inner shroud 64, and a seal ring 65 retained by the retaining ring 62.

The retaining ring 62 is an assembled member assembled in a plurality side by side in the circumferential direction onto the ring-shaped member via the vanes 63 and the like. The plurality of vanes 63 are provided on a stationary side in a periphery of the turbine rotor 54 (refer to FIG. 1) of the turbine 53. The plurality of vanes 63 form sets with blades attached on the turbine rotor 54 side, and thus constitute stages.

A plurality of fitting grooves 2, 2a for attaching a heat shield ring 67 are formed in the blade ring 61 of the present embodiment. The fitting grooves 2, 2a are formed continuously in the circumferential direction of the blade ring 61, on the inner side in a radial direction of the blade ring 61 (hereinafter simply referred to as the radial direction). The heat shield ring 67 fitted to at least two fitting grooves 2a of the plurality of fitting grooves 2, 2a is used to fix the vanes 63.

Figure 5:
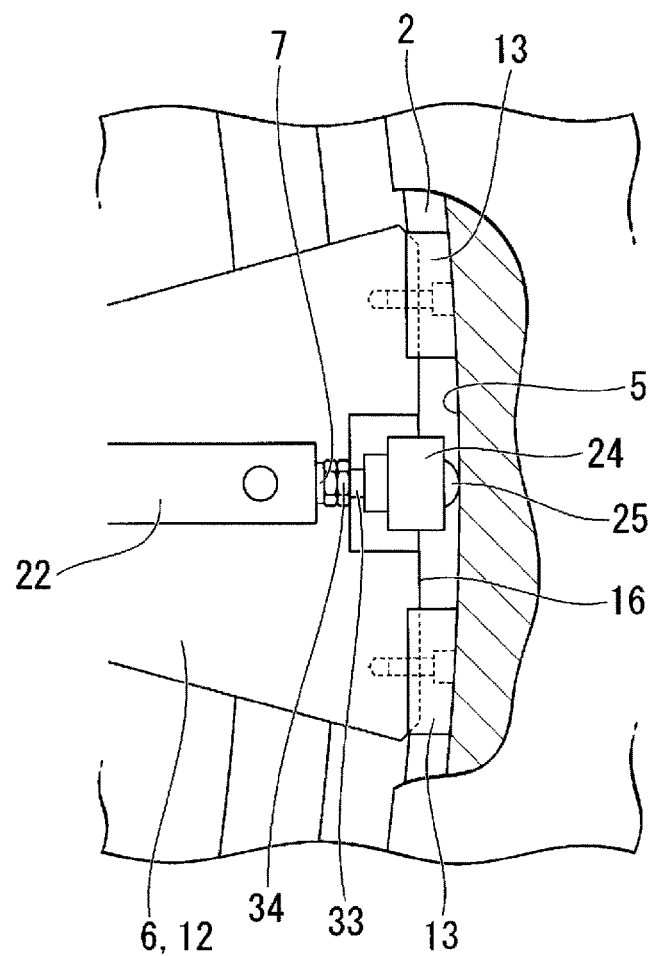
FIG. 5 is a plan view of the measurement device for a ring-shaped assembly of the embodiment of the present invention, illustrating an enlarged view of a connecting part with the blade ring.
Figure 6:
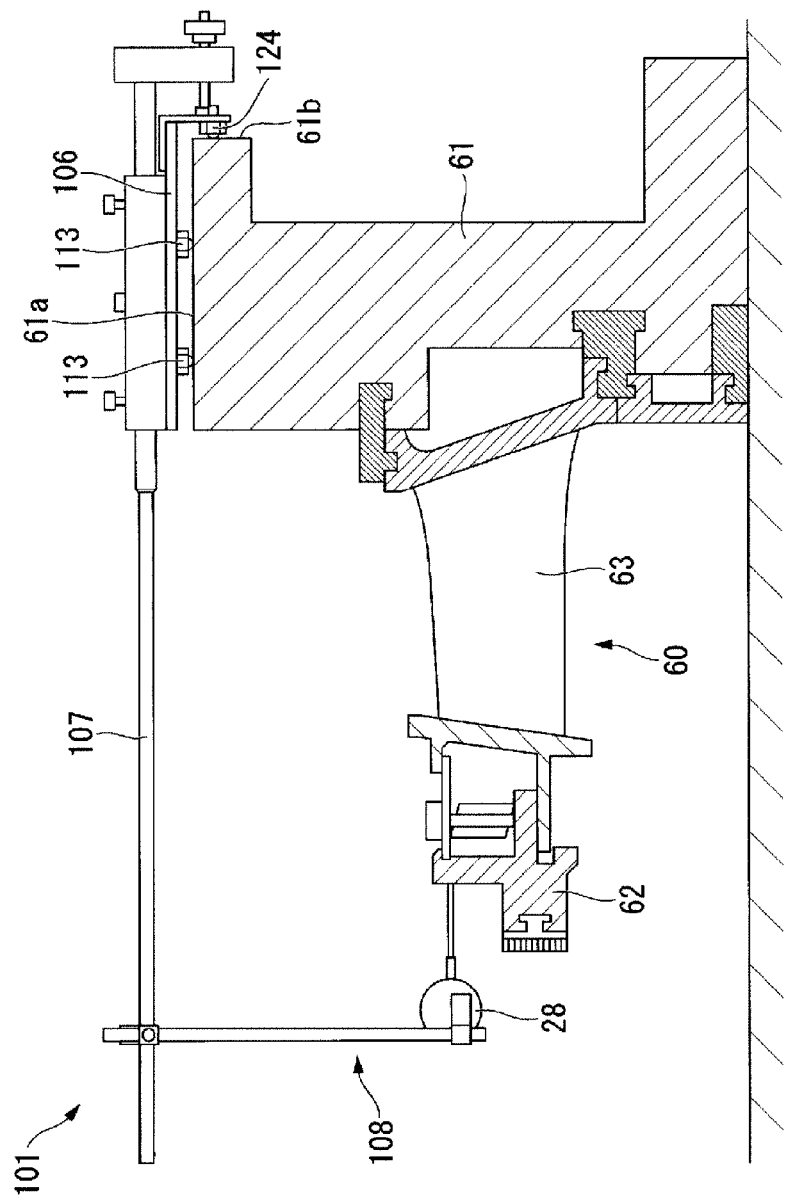
FIG. 6 is a side view of a conventional measurement device for a ring-shaped assembly.

The measurement device 1 of the present embodiment is used by being attached to one fitting groove 2 that differs from the fitting grooves 2a. The fitting groove 2 is formed by machining so that a cross-sectional shape thereof is uniform as viewed in the circumferential direction. Specifically, the cross-sectional shape of the fitting groove 2 forms a rectangular shape with an inner circumferential side in the radial direction open, as illustrated in FIG. 5 as well. The fitting groove 2 has a ridge 3 that retains the heat shield ring 67 when the heat shield ring 67 is attached to the fitting groove 2.

The fitting groove 2 has a reference surface 4 that is a surface on an outer side in the radial direction of the ridge 3, and faces the outer side in the radial direction. The reference surface 4 is a surface that serves as a reference point on the blade ring 61 side when measuring the coaxiality of the ring-shaped assembly 60 using the measurement device 1. The reference surface 4 extends in the circumferential direction, and is formed so as to circle the blade ring 61.

The fitting groove 2 is a groove formed by machining. Consequently, the reference surface 4 is a machined surface formed by machining, and is formed while ensuring accuracy.

Further, the fitting groove 2 has an opposing surface 5 that is a surface facing a side opposite the reference surface 4 in the radial direction, that is, a surface that faces the inner side in the radial direction. In other words, the reference surface 4 and the opposing surface 5 are surfaces provided on both mutually opposing sides in the radial direction. The opposing surface 5, similarly to the reference surface 4, extends in the circumferential direction, and is formed so as to circle the blade ring 61.

Further, a protrusion 68 is provided on an outer circumferential side edge part 61a of the blade ring 61 of the present embodiment. That is, the outer circumferential side edge part 61a of the blade ring 61 of the present embodiment is not flat.

Next, the details of the measurement device 1 will be described.

Figure 3:
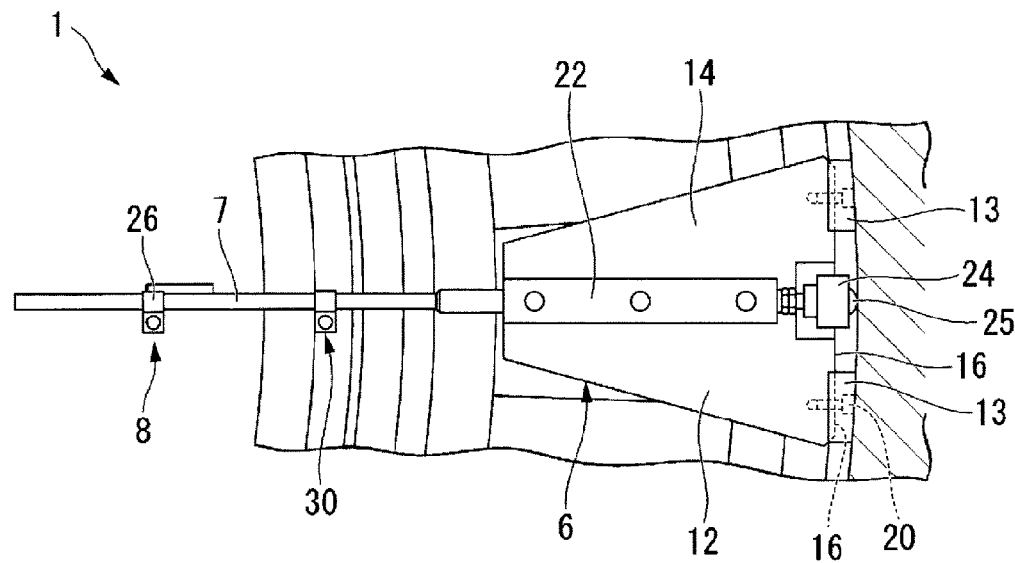
FIG. 3 is a cross-sectional view taken along line A-A in FIG. 2, illustrating a plan view of the measurement device for a ring-shaped assembly.

As illustrated in FIG. 2 and FIG. 3, the measurement device 1 has a plate-shaped base section 6, a rod-shaped shaft section 7 attached to the base section 6, a probe section 8 attached to a tip side (the inner side in the radial direction of the blade ring 61) of the shaft section 7, and a data processing unit (not illustrated). The shaft section 7 functions as a connecting section that connects the probe section 8 and the base section 6.

The base section 6 is a section that serves as a reference on the blade ring 61 side. The base section 6 has a plate-shaped baseplate 12, a pair of fitted members 13 that are attached to the baseplate 12 and retain the base section 6 on the blade ring 61 by fitting into the fitting grooves 2, and a guide roller 24 formed of a ball caster.

The baseplate 12 is a plate-shaped member having an isosceles trapezoid shape. The baseplate 12 has a top surface 14 that faces upward and a bottom surface 15 that faces downward when the base section 6 is attached to the blade ring 61, and a connecting surface 16 that is a surface located in a position equivalent to the bottom side of the isosceles trapezoid and orthogonal to the top surface 14 and the bottom surface 15. The baseplate 12 is disposed so that the top surface 14 and the bottom surface 15 are orthogonal to an axis of the blade ring 61, the connecting surface 16 extends along a surface on the inner circumferential side of the blade ring 61, and a side equivalent to the top side of the trapezoid faces the center of the blade ring 61.

Figure 4:
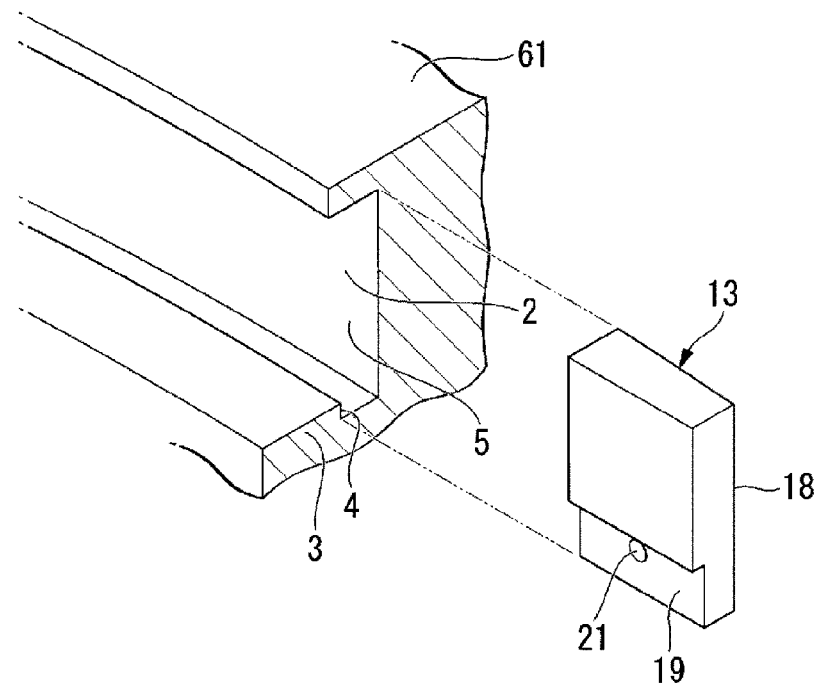
FIG. 4 is a perspective view illustrating a fitted member inserted into a fitting groove of a blade ring.

As illustrated in FIG. 4, the fitted member 13 is a substantially rectangular parallelepiped-shaped block-like member capable of sliding and fitting into the fitting groove 2 that extends in the circumferential direction. The fitted member 13 has a back surface 18 formed so as to extend along the opposing surface 5 of the fitting groove 2, and a reference contact surface 19 (a first contact section) formed on a side opposite the back surface 18 and formed so as to extend along the reference surface 4 of the fitting groove 2. The back surface 18 and the reference contact surface 19 are curved surfaces, each having a radius of curvature substantially the same as the surface on the inner circumferential side of the blade ring 61. Further, the fitted member 13 is, for example, formed of a metal such as aluminum.

As illustrated in FIG. 3, the fitted member 13 is attached to the connecting surface 16 of the baseplate 12 via a fastening member 20 such as a bolt, for example. Specifically, the fitted member 13 is attached using a thread hole that is formed in the connecting surface 16 of the baseplate 12, and formed in a direction along the top surface 14 and the bottom surface 15 of the baseplate 12. A counterboring process is performed appropriately on a fixing hole 21 (refer to FIG. 4) on the fitted member 13 side so that a head portion of the fastening member 20 that fixes the fitted member 13 does not interfere with the fitting groove 2.

The shaft section 7 is, for example, constituted of a hollow long member made of aluminum, and is arranged on the base section 6 so as to extend to the inner side in the radial direction of the blade ring 61 during measurement. The shaft section 7 is attached so as to be displaceable in a longitudinal direction (an axial direction) with respect to the base section 6.

The shaft section 7 is disposed so as to be supported by a guide section 22 fixed on the base section 6. A ball bearing is connected to the guide section 22. Accordingly, the shaft section 7 is displaceable in the longitudinal direction of the guide section 22.

As illustrated in FIG. 5, the guide roller 24 is fixed to an end part on the base section 6 side of the shaft section 7. The guide roller 24 is fixed so that a ball 25 (a second contact section) that forms a spherical shape faces the axial direction of the shaft section 7. The guide roller 24 is supported by the baseplate 12 via the shaft section 7 and the guide section 22.

The ball 25 of the guide roller 24 is disposed so as to come into contact with the opposing surface 5 of the fitting groove 2. In other words, the shaft section 7 is disposed so that the axis of the shaft section 7 and the opposing surface 5 of the ring-shaped groove are orthogonal. A fixing shaft 33 that is extended from the guide roller 24 and includes a male thread groove formed on an outer circumference is provided on the guide roller 24.

The guide roller 24 is fixed by screwing the fixing shaft 33 into a female thread hole formed in the end part of the shaft section 7, and further tightening the fixing shaft 33 by a nut 34. A radial position of the guide roller 24 can be adjusted by this fixing mechanism.

As illustrated in FIG. 2, the probe section 8 is a section that comes into contact with the inner circumferential surface of the retaining ring 62 during measurement, and defines the measurement point of the retaining ring 62. The probe section 8 is attached to the tip of the shaft section 7 via a predetermined joint 26. The probe section 8 has a probe stay 27 that extends orthogonally downward from the shaft section 7, and a dial gauge 28 that is a measuring unit attached to a lower part of the probe stay 27.

The dial gauge 28 is fixed so that a measuring probe 29 (a third contact section) comes into contact with an inner circumferential surface 62a (a measurement-target part) of the retaining ring 62. Positions in the radial direction and a vertical direction of the dial gauge 28 are adjustable by the joint 26.

A shaft supporter 30, which is a support member that supports the shaft section 7, is provided on the shaft section 7 between the probe section 8 and the base section 6. The shaft supporter 30 is attached to the shaft section 7 via the predetermined joint 26. The shaft supporter 30 has a stay 31 that extends orthogonally downward from the shaft section 7, and a ball caster 32 that is attached to a lower part of the stay 31.

Positions in the radial direction and the vertical direction of the ball caster 32 are adjustable by the joint 26. In the measurement device 1 of the present embodiment, positions in the radial direction and the vertical direction of the ball caster 32 are regulated so that the ball caster 32 comes into contact with a top surface 35 of the retaining ring 62.

Next, a measurement method for the ring-shaped assembly 60 that uses the measurement device 1 of the present embodiment, and a manufacturing method of a rotating machine that uses this measurement method will be described. The measurement device 1 is used with the blade ring 61 disposed so that the axial direction of the blade ring 61 extends along the vertical direction.

(Ring-Shaped Assembly Assembling Step)

First, a plurality of retaining rings 62 are assembled onto the blade ring 61 so as to be arranged side by side in the circumferential direction. Specifically, each of the vanes 63 is fixed to the blade ring 61 using the heat shield ring 67, and each of the retaining rings 62 is attached to a flange of the inner shroud 64 integrated with the vane 63.

(Base Section Disposing Step)

Next, the measurement device 1 is attached to the blade ring 61. Specifically, as illustrated in FIG. 4, the fitted member 13 is inserted from the circumferential direction into the fitting groove 2. Accordingly, as illustrated in FIG.

3, the base section 6 of the measurement device 1 is temporarily fixed to the blade ring 61. During attachment, the blade ring 61 is in a divided state and therefore the fitted member 13 can be inserted from the end part of the fitting groove 2.

Next, a plurality of elements that constitute the blade ring 61 are connected to each other, and the ring-shaped assembly 60 is assembled. That is, the vane 63, the retaining ring 62 (a measurement-target member), and the like are attached to the inner circumferential side of the ring-shaped blade ring 61 (the ring-shaped member). This ring-shaped assembly 60 is the measurement target of the measurement device 1 of the present embodiment. It should be noted that, while the ring-shaped assembly 60 is disposed on a floor surface, the ring-shaped assembly 60 may be placed on a plurality of predetermined work blocks.

Next, the positions of the shaft supporter 30 and the probe section 8 are temporarily adjusted. Specifically, the position of the shaft supporter 30 is adjusted so that the ball caster 32 of the shaft supporter 30 is in a predetermined position on the top surface 35 of the retaining ring 62, and that the shaft section 7 is substantially horizontal. Further, the position of the probe section 8 is adjusted so that the measuring probe 29 of the dial gauge 28 comes into contact with the inner circumferential surface 62a of the retaining ring 62.

Next, the ball 25 of the guide roller 24 is pressed against the opposing surface 5. Specifically, with the nut 34 loosened, a protruding amount of the guide roller 24 is adjusted, and the position in the axial direction of the guide roller 24 is fixed with the ball 25 of the guide roller 24 sufficiently pressed against the opposing surface 5. Accordingly, the reference contact surface 19 of the fitted member 13 comes into contact with the reference surface 4 of the fitting groove 2, defining the reference point on the blade ring 61 side.

(Measurement-Target Part Contacting Step)

After the guide roller 24 is fixed in the above-described base section disposing step, the measuring probe 29 of the temporarily fixed probe section 8 is made to contact with the inner circumferential surface 62a of the retaining ring 62. Then, the temporarily fixed shaft supporter 30 and probe section 8 are fixed.

(Displacement Measuring Step)

Next, the position of the retaining ring 62 with respect to the blade ring 61 in this position that serves as a reference is measured. Specifically, the numeric value of the dial gauge 28 that constitutes a part of the probe section 8 is transferred to and recorded in the data processing unit.

Then, the base section 6 is slid in the circumferential direction, and the measured value of each point other than the position that serves as the reference is acquired. At this time, the fitted member 13 moves in an interior of the fitting groove 2, and the ball 25 of the guide roller 24 rolls on the opposing surface 5 in the circumferential direction.

Next, the position of the retaining ring 62 is determined on the basis of the acquired measured value. For example, when the acquired measured value is within a predetermined setting range, the blade ring 61 and the retaining ring 62 are determined to be appropriately positioned. In this case, the measurement device 1 is removed, and the positioning work is completed.

On the other hand, when the acquired measured value is not within the predetermined setting range, the attached position of the retaining ring 62 with respect to the blade ring 61 is finely adjusted. Accordingly, the blade ring 61 and the retaining ring 62 are appropriately positioned. It should be noted that this positioning work is performed on each of the blade rings 61 of second-stage vanes to fourth-stage vanes of the turbine 53.

(Ring-Shaped Assembly Attaching Step)

Lastly, the ring-shaped assembly 60 is assembled onto the turbine casing 55 (the casing) of the turbine 53.

According to the above-described embodiment, the guide roller 24 presses against the opposing surface 5 of the fitting groove 2, thereby causing the reference contact surface 19 of the fitted member 13 to sufficiently come into contact with the reference surface 4. As a result, the position of the base section 6 with respect to the reference surface 4 is stabilized, making it possible to increase the accuracy when measuring the displacement of the measuring probe 29 relative to the base section 6. That is, it is possible to increase the accuracy when measuring the relative position in the radial direction of the retaining ring 62 with respect to the blade ring 61 that constitutes a part of the ring-shaped assembly 60. Accordingly, the assembly accuracy of the retaining ring 62 with respect to the blade ring 61 can be ensured.

The measurement device 1 can be moved in the circumferential direction with the position of the base section 6 with respect to the reference surface 4 retained, making it possible to measure a change in the displacement of the measuring probe 29 relative to the base section 6 with high accuracy.

Further, the measurement device 1 is fixed via the fitting groove 2, making it possible to fix the measurement device 1 to the blade ring 61 even when there is the protrusion 68 on the upper part in the vertical direction of the blade ring 61.

Moreover, the fitting groove 2 for fixing the heat shield ring 67 is utilized to fix the measurement device 1, making it possible to fix the measurement device 1 to the blade ring 61 without newly machining a groove for fixing the base section 6 of the measurement device 1.

Furthermore, the shaft supporter 30 is provided for the shaft section 7, making it possible to stabilize the position of the measuring probe 29 of the dial gauge 28 even if the rigidity of the shaft section 7 is insufficient.

In addition, it is possible to easily fix the base section 6 and the blade ring 61 by sliding the fitted member 13 along the fitting groove 2.

It should be noted that the technical scope of the present invention is not limited to the embodiment described above, but includes various modifications of the embodiment within a scope that does not deviate from the spirit of the present invention. That is, the configurations and the like set forth in the above-described embodiment are merely examples, and may be suitably changed.

For example, while the ring-shaped assembly 60 having the blade ring 61 and the retaining ring 62 of the turbine 53 serves as the measurement target in the present embodiment, the present invention is not limited thereto, and any assembly in which a plurality of assembled members arranged side by side in a circumferential direction are assembled onto a ring-shaped member can serve as the measurement target.

Further, while the configuration in which two fitted members 13 that connect the base section 6 and the blade ring 61 are provided has been shown, there is no quantity requirement for the fitted members 13.

INDUSTRIAL APPLICABILITY

According to this measurement device for a ring-shaped assembly, the second contact section presses against the opposing surface, thereby causing the first contact section to come into contact with the reference surface with a predetermined pressing force. As a result, the position of the base section with respect to the reference surface is stabilized, making it possible to increase the accuracy when measuring the displacement of the third contact section relative to the base section. That is, it is possible to increase the accuracy when measuring the relative positions in the radial direction of the assembled members with respect to the ring-shaped member in the ring-shaped assembly.

REFERENCE SIGNS LIST

1 Measurement device
2 Fitting groove
3 Ridge
4 Reference surface
5 Opposing surface
6 Base section
7 Shaft section (connecting section)
8 Probe section
12 Baseplate
13 Fitted member
14 Top surface
15 Bottom surface
16 Connecting surface
18 Back surface
19 Reference contact surface (first contact section)
20 Fastening member
21 Fixing hole
22 Guide section
24 Guide roller
25 Ball (second contact section)
26 Joint
27 Probe stay
28 Dial gauge (measurement unit)
29 Measuring probe (third contact section)
30 Shaft supporter (support member)
31 Stay
32 Ball caster
50 Gas turbine
51 Compressor
52 Combustor
53 Turbine
54 Turbine rotor
55 Turbine casing (casing)
60 Ring-shaped assembly
61 Blade ring (ring-shaped member)
62 Retaining ring (assembled member)
62a Inner circumferential surface (measurement-target part)
65 Seal ring
67 Heat shield ring
68 Protrusion

The invention claimed is:

1. A measurement device for a ring-shaped assembly that, in a ring-shaped assembly having a plurality of assembled members arranged side by side in a circumferential direction that are assembled onto a ring-shaped member, measures relative positions in a radial direction of the assembled members with respect to the ring-shaped member, the measurement device comprising:
   a first contact section that comes into contact with a reference surface that is continuous in the circumferential direction of the ring-shaped member and is capable of moving in the circumferential direction along the reference surface;
   a second contact section that is capable of pressing against an opposing surface that faces an opposite side in the radial direction from the reference surface of the ring-shaped member and capable of adjusting a position in the radial direction;
   a base section that supports the first contact section and the second contact section;
   a third contact section that comes into contact with a measurement-target part of the assembled member;
   a connecting section that connects the third contact section and the base section; and
   a measurement unit that measures a displacement of the third contact section relative to the base section,
   wherein the reference surface and the opposing surface are disposed facing each other,
   the first contact section is a pair of block-like members disposed in the circumferential direction and spaced apart from each other, and
   the second contact section is disposed in a center in the circumferential direction between the pair of block-like members.

2. The measurement device for a ring-shaped assembly according to claim 1, wherein
   the second contact section forms a spherical shape capable of rolling on the opposing surface in the circumferential direction.

3. The measurement device for a ring-shaped assembly according to claim 1, wherein
   the reference surface and the opposing surface are surfaces provided on both mutually opposing sides in the radial direction that constitute a groove formed on an inner side in the radial direction of the ring-shaped member; and
   the base section further includes a block-like fitted member that includes the first contact section and is inserted into the groove, and a guide roller that includes the second contact section.

4. The measurement device for a ring-shaped assembly according to claim 3, wherein
   the ring-shaped member is a blade ring of a turbine; and
   the groove is a groove used for fixing a heat shield ring of the turbine.

5. The measurement device for a ring-shaped assembly according to claim 1, wherein
   the base section extends to an inner side in the radial direction of the ring-shaped member, and
   the connecting section is provided with a support member that supports the connecting section, the support member extending from the connecting section along a center axis direction of the ring-shaped member, and a tip of the support member capable of coming into contact with the assembled member.

6. A measurement method for a ring-shaped assembly that, in a ring-shaped assembly having a plurality of assembled members arranged side by side in a circumferential direction that are assembled onto a ring-shaped member, measures relative positions in a radial direction of the assembled members with respect to the ring-shaped member, the measurement method comprising:
   a base section disposing step of causing a first contact section of a base section of a measurement device to come into contact with a reference surface that is continuous in the circumferential direction of the ring-shaped member and causing a second contact section of the base section of the measurement device to press against an opposing surface that faces an opposite side in the radial direction from the reference surface of the ring-shaped member;

a measurement-target part contacting step of causing a third contact section connected to the base section to come into contact with a measurement-target part of the assembled member; and a displacement measuring step of measuring a displacement in the radial direction of the third contact section relative to the base section while moving the base section in the circumferential direction along the reference surface with the first contact section in contact with the reference surface, wherein the reference surface and the opposing surface are disposed facing each other, the first contact section is a pair of block-like members disposed in the circumferential direction and spaced apart from each other, and the second contact section is disposed in a center in the circumferential direction between the pair of block-like members.

7. The measurement method for a ring-shaped assembly according to claim 6, wherein in the base section disposing step, with surfaces on both mutually opposing sides in the radial direction of a groove formed in the ring-shaped member serving as the reference surface and the opposing surface, the fitted member of the base section including the first contact section is inserted into the groove; and in the displacement measuring step, the fitted member is moved in an interior of the groove.

8. A manufacturing method of a rotating machine, comprising:

a ring-shaped assembly assembling step of assembling the plurality of assembled members onto the ring-shaped member so that the assembled members are arranged side by side in a circumferential direction;

a measuring step of measuring relative positions in a radial direction of the assembled members with respect to the ring-shaped member by the measurement method for a ring-shaped assembly according to claim 6; and a ring-shaped assembly attaching step of assembling the ring-shaped assembly onto a casing, with assembly accuracy of the assembled members with respect to the ring-shaped member ensured on the basis of measurement results from the measuring step.

* * * * *